(12) United States Patent
Koyama et al.

(10) Patent No.: US 6,374,690 B1
(45) Date of Patent: Apr. 23, 2002

(54) GEARSHIFT

(75) Inventors: Shigeru Koyama; Kiyokazu Ohkubo, both of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/506,734

(22) Filed: Feb. 18, 2000

(30) Foreign Application Priority Data

Feb. 22, 1999 (JP) ............................................. 11-042842

(51) Int. Cl.⁷ .......................... F16H 63/20; F16H 63/32
(52) U.S. Cl. ...................... 74/473.1; 74/473.36; 74/359
(58) Field of Search ........................... 74/473.1, 473.21, 74/473.22, 473.24, 473.25, 473.26, 473.27, 473.28, 473.33, 473.34, 473.36, 473.37, 359

(56) References Cited

U.S. PATENT DOCUMENTS

| | | |
|---|---|---|
| 3,744,336 A | 7/1973 | Lancaster |
| 4,472,868 A * | 9/1984 | Takahashi ................ 74/473.37 |
| 4,558,610 A | 12/1985 | Takahashi |
| 4,625,576 A * | 12/1986 | Okuda et al. ............ 74/473.33 |
| 4,757,726 A | 7/1988 | Yamaguchi et al. |
| 5,819,590 A | 10/1998 | Kuwahara |

FOREIGN PATENT DOCUMENTS

| | | |
|---|---|---|
| EP | 0 541 098 A1 | 5/1993 |
| JP | 8-14385 | 1/1996 |
| JP | 9-250635 | 9/1997 |

\* cited by examiner

*Primary Examiner*—David A. Bucci
*Assistant Examiner*—William C Joyce
(74) *Attorney, Agent, or Firm*—Armstrong, Westerman, Hattori, McLeland & Naughton, LLP

(57) ABSTRACT

In a transmission which incorporates a plurality of speed change gear trains, a plurality of clutches to select one of the gear trains for power transmission and a plurality of shift forks to selectively activate one of the clutches, a gearshift coveys a force applied by a shift lever selectively to one of the shift forks to achieve a gear change. The gearshift comprises a plurality of linkages which convey the force applied by the shift lever 41 to the shift forks 73 and 76 selectively. In this gearshift, at least two of these linkages include rocking levers 65 and 66, respectively, each of which functions to reverse the direction of the force applied by the shift lever. These rocking levers are disposed on a common pivot or a retaining pin 67, such that each rocking lever can swing independently thereon.

8 Claims, 9 Drawing Sheets

GEARSHIFT

RELATED APPLICATIONS

This application claims the priority of Japanese Patent Application No. 11-042842 filed on Feb. 22, 1999, which is incorporated herein by reference.

FIELD OF THE INVENTION

The present invention relates generally to a transmission which includes shift forks for activating clutches selectively to establish power transmission through speed change gear trains, and particularly to a gearshift which conveys a force applied by a shift lever to a shift fork appropriate for activating a target clutch.

BACKGROUND OF THE INVENTION

In general, such gearshifts are used in manual shift transmissions. When the driver manipulates the shift lever for a desired gear change, a force applied to the shift lever is conveyed to a shift fork which activates a corresponding clutch (for example, a synchromesh type clutch) in the gearshift. In the gearshift, a plurality of speed change gear trains are disposed parallel with one another and rotationally between two shafts which are provided parallel with each other, and a plurality of clutches are provided each for a corresponding gear train, on one of the shafts.

In such a transmission, the number of available speed change ratios corresponds to the number of gear trains which are available for speed change, and a clutch and a shift fork are disposed close to each of the speed change gear trains. Typically, a transmission is equipped with a certain number of speed change ratios to satisfy the performance need of a vehicle which incorporates the transmission. Recent years, transmissions have been required to have a large number of speed change ratios to improve the driving characteristics of vehicles. For a transmission to have a large number of speed change ratios, it must have the corresponding numbers of clutches and shift forks. Because of design limitations for layout and strength, the clutches tend to be disposed away from one another in the transmission, and the shift forks are also disposed away from one another accordingly. If the shift forks are disposed apart from one another, then a mechanism which conveys the force applied by the shift lever to the respective shift forks must be extended to the positions where the shift forks are located in the transmission. However, such extension is a disadvantage because the shifting force conveying mechanism incorporated in the gearshift becomes complex in design.

The directions and pattern of the movements of the shift lever are determined to facilitate the manageability of the shift lever by the driver. On the other hand, the direction of the movement of each shift fork is determined consequently to the layout of the gear trains and the clutches whose positions are determined to secure sufficient strength as mentioned above. Therefore, the directions of the movements of the shift lever does not necessarily match the directions of the movements of the shift forks. Therefore, in some cases, the shifting force conveying mechanism of the gearshift includes a rocking lever, which functions to reverse the direction of the shifting force applied by the shift lever, to convey the force to a target shift fork (for example, refer to Japanese Laid-open Patent Publications No. H8 (1996) -14385 (A) and No. H9 (1997) -250635 (A)).

Many prior-art transmissions had only one such rocking lever, so the layout of the rocking lever was relatively easy and simple. However, as transmissions have acquired an increased number of speed change ratios, requiring an increased number of clutches, recently, a plurality of rocking levers are now necessary. In this case, because each rocking lever must be provided to a corresponding linkage which conveys the shifting force independently, there is a problem that the design of a gearshift which incorporates a plurality of rocking levers tends to become complicated.

SUMMARY OF THE INVENTION

To solve the above mentioned problem, the present invention presents a gearshift which includes a plurality of rocking levers, yet whose design is relatively simple.

It is another object of the present invention to provide a gearshift which enables a plurality of rocking levers to be assembled and incorporated therein relatively easily and thereafter be retained there securely.

The present invention provides a gearshift for a transmission which incorporates a plurality of speed change gear trains (e.g., the LOW, SECOND, THIRD, FOURTH, FIFTH, SIXTH and REVERSE gear trains of the embodiment described in the following section), a plurality of clutch means (e.g., the LOW, SECOND, THIRD, FOURTH, FIFTH, SIXTH and REVERSE clutches of the following embodiment) to select one of these gear trains for power transmission, and a plurality of shift forks ( e.g., the LOW or SECOND shift fork 73, the THIRD or FOURTH shift fork 57, the FIFTH or SIXTH shift fork 58 and the REVERSE shift fork 76 of the following embodiment). This gearshift, which coveys the force applied by a shift lever to the shift forks selectively to achieve a gear change, comprises a plurality of linkages which convey the force applied by the shift lever to the shift forks selectively. In this gearshift, at least two of the linkages include rocking levers (e.g., the LOW or SECOND rocking lever 65 and the REVERSE rocking lever 66 of the following embodiment), respectively, each of which functions to reverse the direction of the force applied by the shift lever. These rocking levers are disposed on a common pivot (e.g., the retaining pin 67 of the following embodiment), such that each rocking lever can swing independently thereon.

A gearshift according to the present invention is useful especially for a transmission whose clutches are disposed apart from one another because of a design limitation inevitable for incorporating a large number of speed change ratios. The shifting force applied by the shift lever is conveyed securely and selectively through a plurality of rocking levers to the shift forks which activate the corresponding clutches. Because the rocking levers are disposed each independently pivotable on a common pivot, the mounting of the rocking levers is simple. Therefore, the gearshift itself can be assembled relatively easily, and its construction can be made simple and compact.

It is preferable that these rocking levers include smooth contact surfaces (e.g., the contact surfaces 65c and 66c of the following embodiment) near the pivot where the rocking levers meet one another in sliding contact. In this construction, the rocking levers disposed next to one another can swing independently and smoothly around the pivot, each rocking lever sliding on the other rocking levers with the smooth contact surfaces, as it swing independently from the others. These contact surfaces are provided only near the pivot to make the contact areas small to minimize friction and to maximize the ease of sliding. Furthermore, because the matching of the contact surfaces of the rocking levers is visually and easily confirmable during assembly, the rocking levers can be assembled in their correct orientation without being positioned in any wrong way.

Preferably, the rocking levers in plurality, which are disposed next to one another and are capable of swinging around the pivot, be disposed such that one ends of the rocking levers engage lever side members ( e.g., the LOW or SECOND shift rod 51 and the REVERSE shift piece 64 of the following embodiment) which are connected to and movable by the shift lever in the axial direction of the transmission while the other ends of the rocking levers engage fork side members (e.g., the engaging member 72 of the LOW or SECOND shift fork shaft 71 and the REVERSE shift fork shaft 75 of the following embodiment) which are connected to and movable with the shift forks in the axial direction of the transmission. In this case, it is preferable that at least one ends or the other ends of the rocking levers be retained between the lever side members or between the fork side members, at the lateral outsides of the rocking levers in the axial direction of the pivot.

In this construction, the upper ends and the lower ends or at least one ends of the rocking levers, which are disposed next to one another, are sandwiched securely between the lever side members and/or between the fork side members, with the rocking levers being still capable of swinging. Therefore, the rocking levers, which are sandwiched at least at one ends thereof, are maintained there, securely without dislocation.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention and wherein.

DESCRIPTION OF THE PREFERRED EMBODIMENTS

Figure 1:
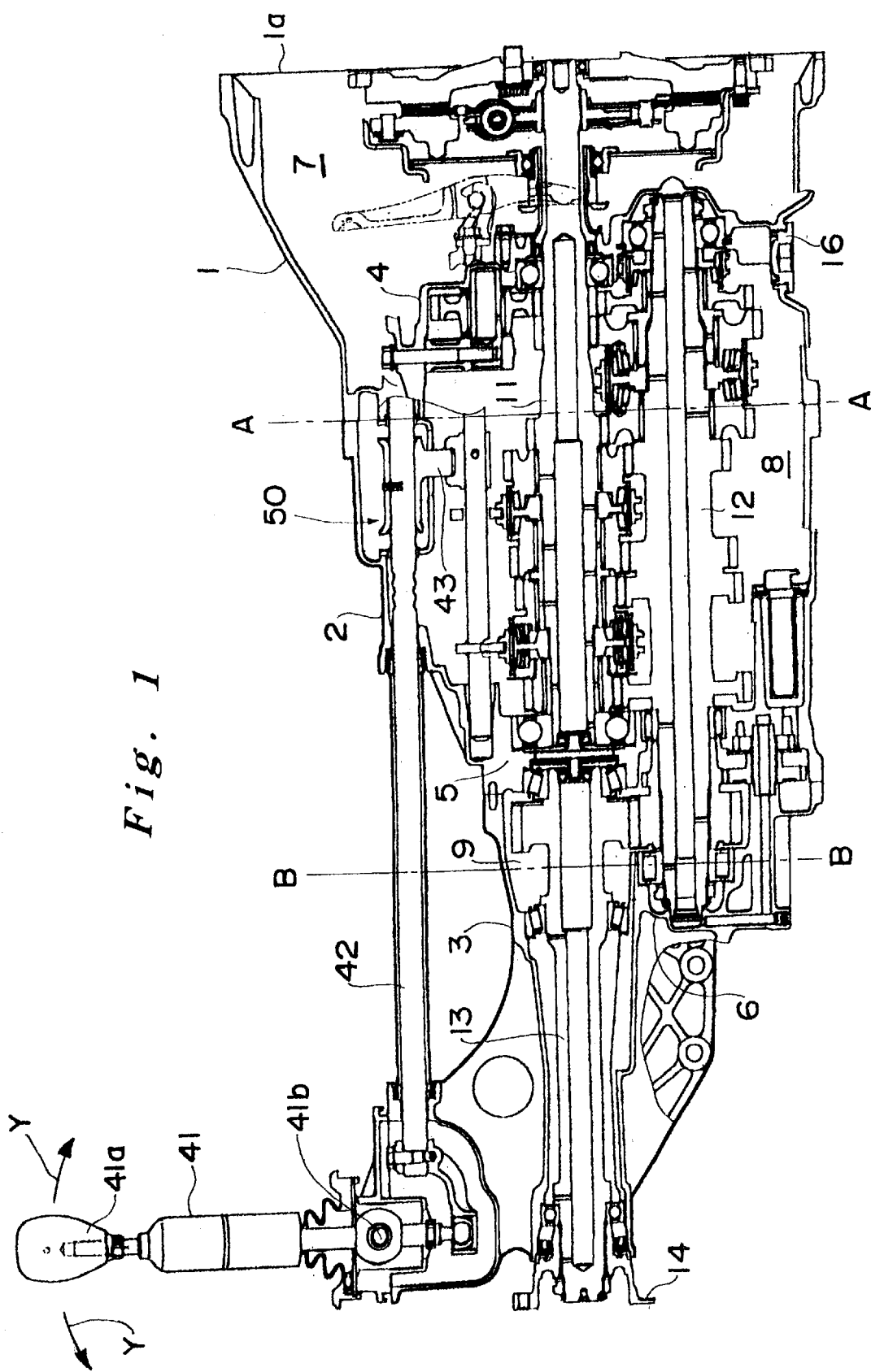
FIG. 1 is a sectional view showing the construction of a countershaft transmission, which incorporates a gearshift according to the present invention.
Figure 2:
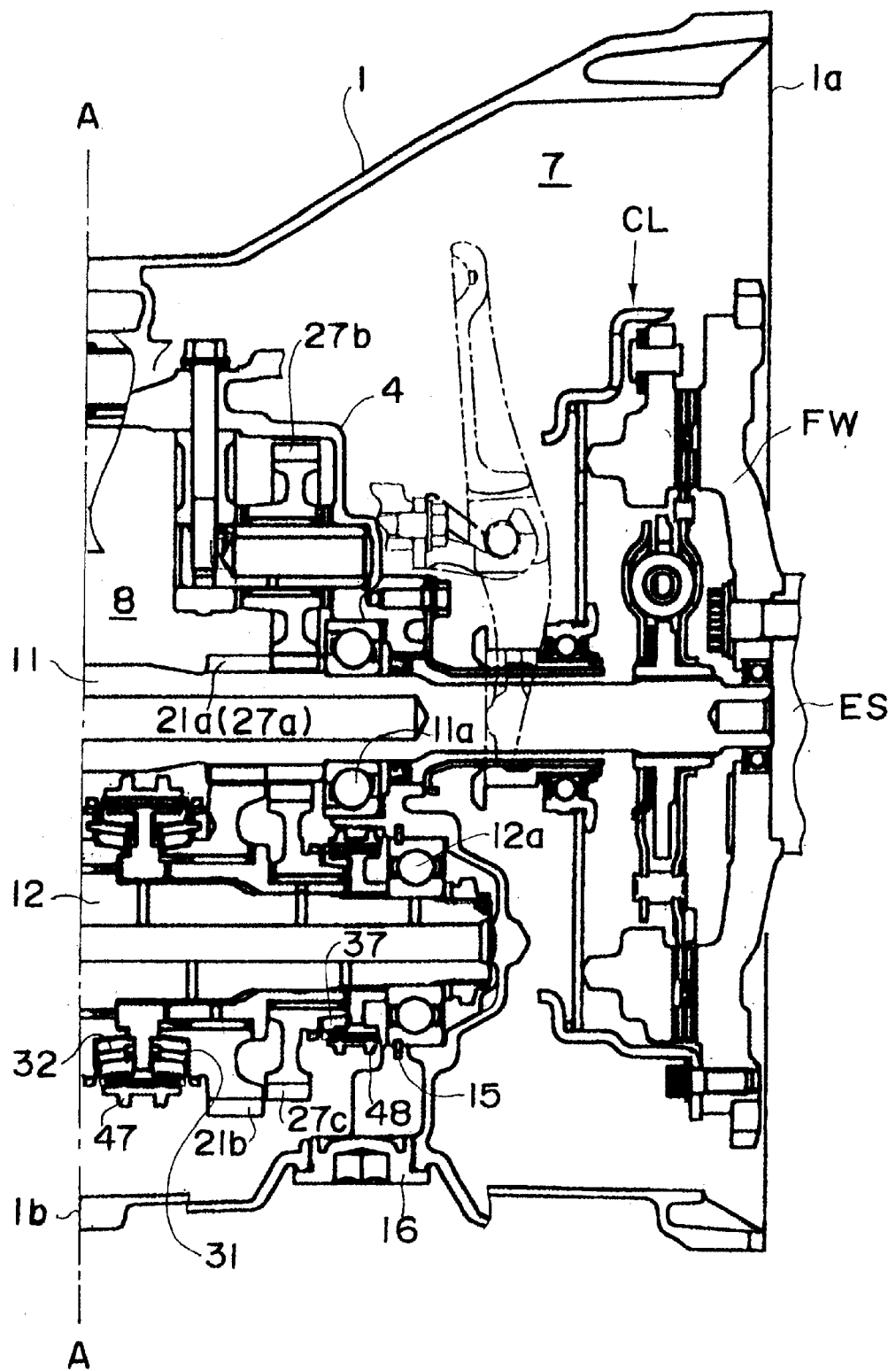
FIG. 2 is an enlarged sectional view showing the right side section of the countershaft transmission.
Figure 3:
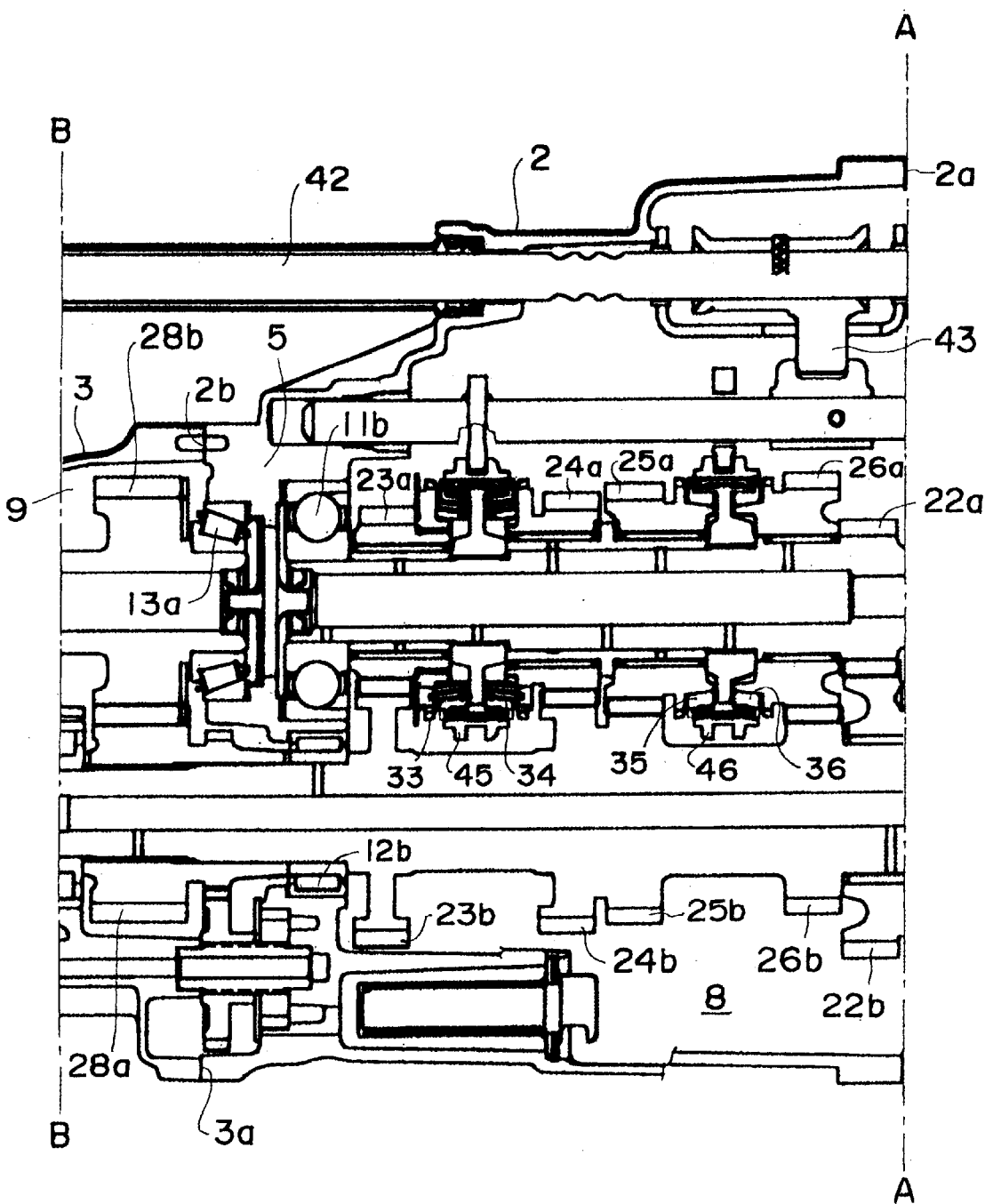
FIG. 3 is an enlarged sectional view showing the central section of the countershaft transmission.
Figure 4:
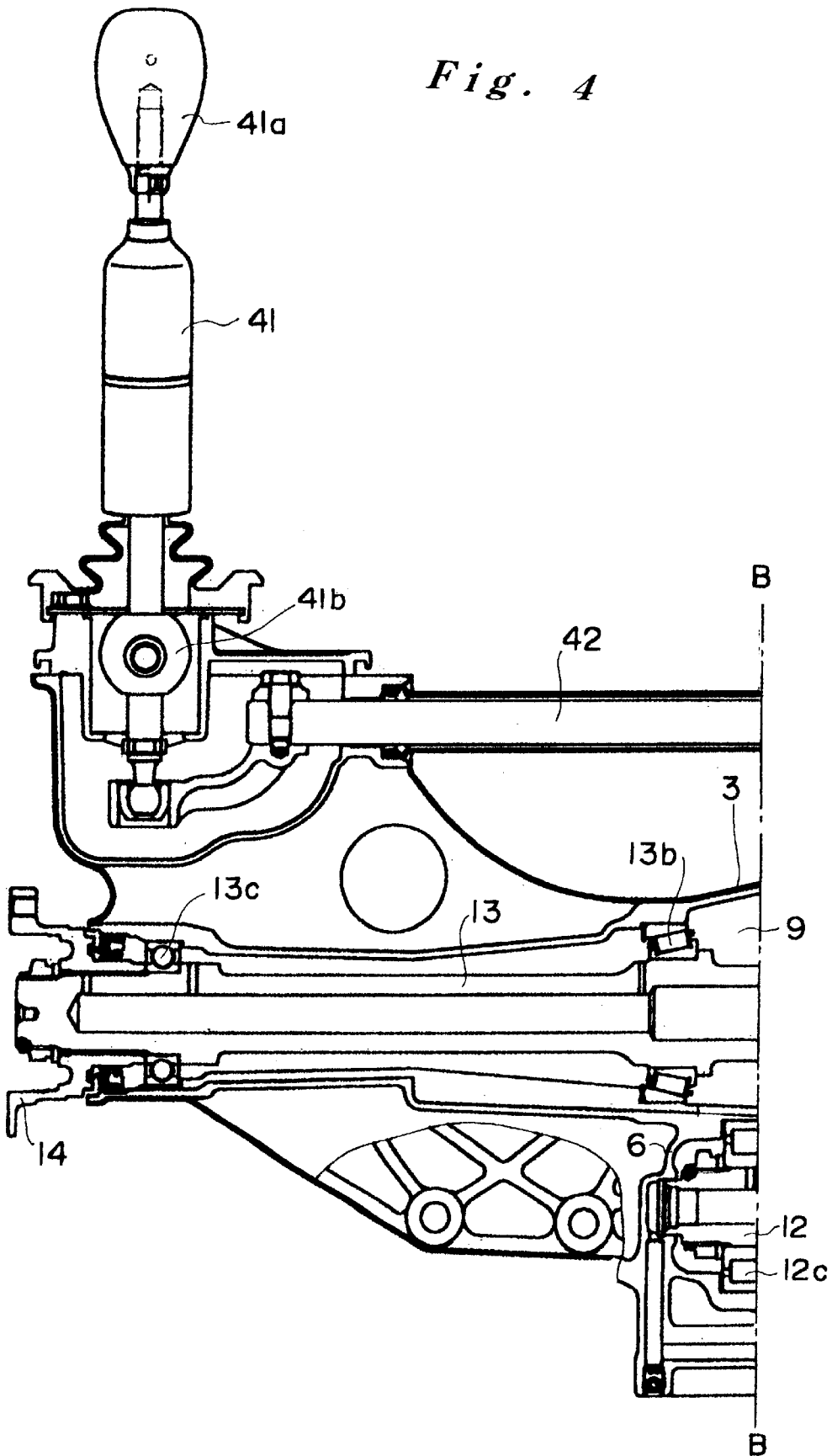
FIG. 4 is an enlarged sectional view showing the left side section of the countershaft transmission.

FIGS. 1, 2, 3 and 4 show the construction of a countershaft transmission which incorporates a gearshift according to the present invention. FIGS. 2, 3 and 4 are enlarged views of the respective three sections of the transmission divided by alternate long and short dash lines A—A and B—B in FIG. 1. In these drawings, hatching is not rendered intentionally to make the structure of the transmission more easily understandable.

In this transmission, a gearshift is disposed in a unified transmission case of first, second and third casings 1, 2 and 3, which are connected firmly consecutively from the side where an engine is placed. The first casing 1 includes a first partition wall 4, the second casing 2 includes a second partition wall 5, and the third casing 3 includes a cover wall 6 on the left side thereof, i.e., on the side opposite to the side where the engine is located. Furthermore, a main clutch CL is disposed in a clutch room 7 which is provided on the right side of the first partition wall 4, i.e., on the side toward the engine, and the right side end face 1*a* of the first casing 1 is connected to a casing which accommodates the engine. Furthermore, a flying wheel FW is provided in the clutch room 7 and is connected to the output shaft ES of the engine, and the above mentioned main clutch CL is mounted on the flying wheel FW.

The left side end face 1*b* of the first casing 1 is fixed with the right side end face 2*a* of the second casing 2, and a first room 8 is defined by the first partition wall 4 of the first casing 1 and the second partition wall 5 of the second casing 2. In this room, an input shaft (first shaft) 11 and a countershaft (second shaft) 12 are disposed parallel with each other, and a total of seven gear trains used for speed change are disposed between these two shafts.

The right side of the input shaft 11 is supported rotatably by a bearing 11*a,* which is retained in the first partition wall 4, and the input shaft 11 extends further rightward through the first partition wall 4 into the clutch room 7 and the right end thereof is connected to the main clutch CL, which connects and disconnects the power transmission from the engine output shaft ES to the input shaft 11. The left side of the input shaft 11 is also supported rotatably by a bearing 11*b*, which is retained in the second partition wall 5. On the other hand, the right end of the countershaft 12 is supported rotatably by a bearing 12*a,* which is retained in the first partition wall 4. The left side of the countershaft 12 is supported rotatably by a bearing 12*b,* which is retained in the second partition wall 5, and the countershaft 12 extends further leftward through the second partition wall 5. To retain the bearing 12*a* in the first partition wall 4, a snap ring 15 is provided around the bearing 12*a,* and to place and remove this snap ring 15, an opening is provided on the lower side of the first casing 1, with a cap 16 covering the opening.

The left side end face 2*b* of the second casing 2 is fixed with the right side end face 3*a* of the third casing 3, and a second room 9 is defined by the second partition wall 5 and the cover wall 6. The left side of the countershaft 12, which passes through the second partition wall 5 as described above, extends into the second room 9, and in parallel with this countershaft 12, an output shaft ( third shaft) 13 is disposed in the second room 9. Between these two shafts 12 and 13, a gear train 28*a* and 28*b* is disposed, and the gears constituting this gear train are mounted on these shafts respectively and mesh with each other. The left end of the countershaft 12 is supported rotatably by a bearing 12*c,* which is retained in the cover wall 6. On the other hand, the right end of the output shaft 13 is supported rotatably by a bearing 13a, which is retained in the second partition wall 5. The central part and the left end of the output shaft 13 are supported also rotatably by bearings 13b and 13c, respectively, which are retained in the cover wall 6. More specifically, the left end of the output shaft 13 passes through the cover wall 6 and protrudes outward, and this protruding portion 14 is connected to a propeller shaft, which is then connected to drive wheels.

The above mentioned seven speed change gear trains, which are disposed parallel with one another between the input shaft 11 and the countershaft 12 in the first room 8, are a REVERSE gear train 27a, 27b and 27c, a LOW gear train 21a and 21b, a SECOND gear train 22a and 22b, a SIXTH gear train 26a and 26b, a FIFTH gear train 25a and 25b, a FOURTH gear train 24a and 24b, and a THIRD gear train 23a and 23b respectively from the right side in the axial direction.

The LOW and SECOND gear trains comprise drive gears 21a and 22a, which are fixed on the input shaft 11, and driven gears 21b and 22b, which are mounted rotatably on the countershaft 12 and mesh with the drive gears 21a and 22a, respectively. To connect and disconnect the driven gears 21b and 22b to and from the countershaft 12 rotationally, synchro-mesh LOW and SECOND clutches 31 and 32 are provided, respectively. The engagement and disengagement of these clutches 31 and 32 are carried out by shifting a LOW or SECOND synchro-sleeve 47 in the axial direction. The REVERSE gear train comprises a drive gear 27a, which is fixed on the input shaft 11, an idle gear 27b, which is supported rotatably on the first partition wall 4 and meshes with the drive gear 27a, and a driven gear 27c, which is mounted rotatably on the countershaft 12 and meshes with the idle gear 27b. To connect and disconnect the driven gear 27c to and from the countershaft 12 rotationally, a synchro-mesh REVERSE clutch 37 is provided there, and the engagement and disengagement of the clutch 37 is carried out by shifting a REVERSE synchro-sleeve 48 in the axial direction.

The THIRD, FOURTH, FIFTH and SIXTH gear trains, respectively, comprise drive gears 23a, 24a, 25a and 26a, which are mounted rotatably on the input shaft 11, and driven gears 23b, 24b, 25b and 26b, which are fixed on the countershaft 12 and mesh with the drive gears 23a~26a. To connect and disconnect the drive gears 23a~26a to and from the input shaft 11 rotationally, synchro-mesh THIRD, FOURTH, FIFTH and SIXTH clutches 33, 34, 35 and 36 are provided, respectively. The engagement and disengagement of these clutches 33~36 are carried out by shifting a THIRD or FOURTH synchro-sleeve 45 or a FIFTH or SIXTH synchro-sleeve 46 in the axial direction.

In this transmission, a gear change or a change of speed change ratio is carried out by selectively engaging one of the LOW, SECOND, THIRD, FOURTH, FIFTH, SIXTH and REVERSE clutches 31~37 to realize a power transmission through a corresponding speed change gear train. This gear change is performed by a driver who manipulates a shift lever 41, which is provided at the driver's seat. The mechanism to realize the shifting functions as follows.

The shift lever 41 is supported by a spherical joint 41b, so that it can swing right and left and back and forth. The driver grips a shift knob 41a, which is provided at the upper end of the shift lever 41, and moves it back and forth (in "Y" direction, which is the direction indicated by arrows Y in FIG. 1) or right and left (in the direction perpendicular to the paper carrying FIG. 1, which direction is hereinafter designated as "X" direction). The movement of the shift lever 41 is conveyed to a main shift rod 42. The swing of the shift lever 41 in the X direction rotates the main shift rod 42 while the swing of the shift lever 41 in the y direction transfers the main shift rod 42 in the axial direction (the right and left direction in the figure). A selector arm 43 is fixed on the other end of the main shift rod 42, and when the shift lever 41 is moved in the X direction, the front end of the selector arm 43 is led into the engaging groove of one of a plurality of shift pieces, which will be described below.

Figure 5:
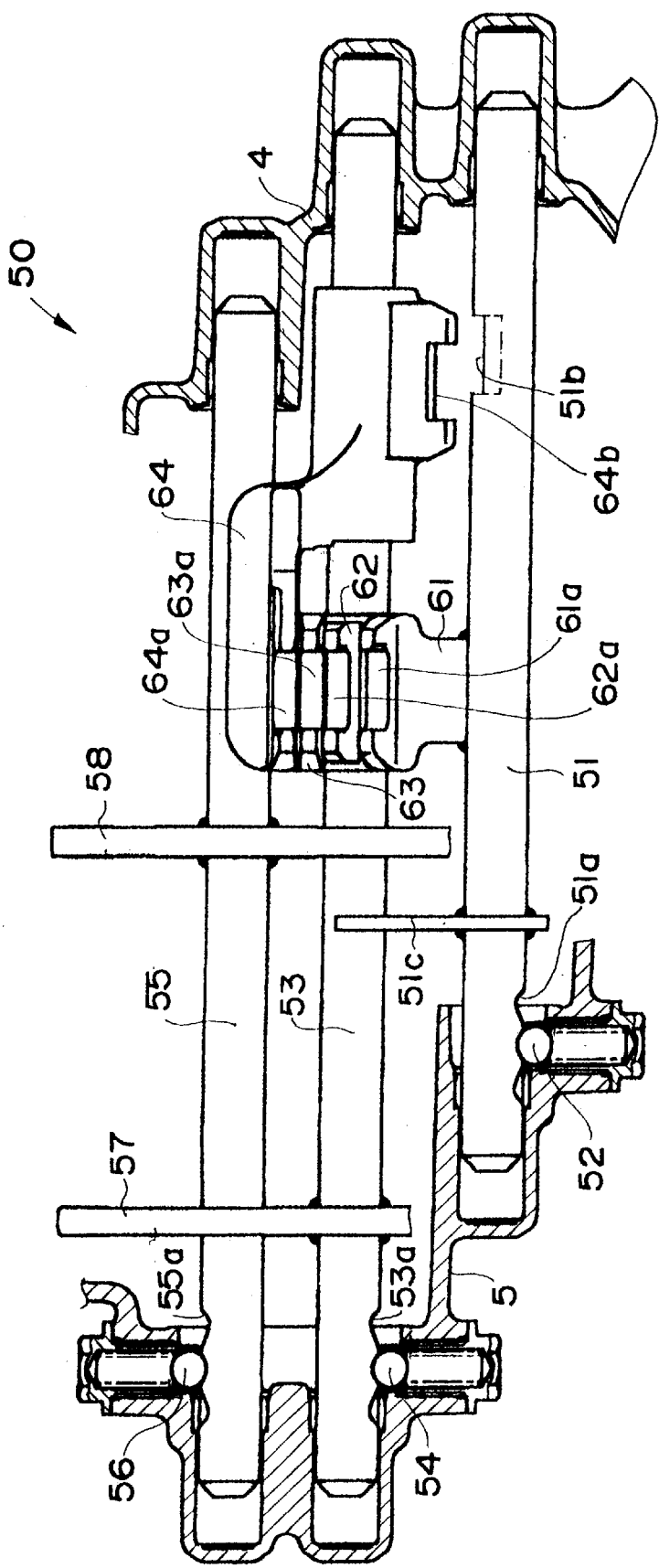
FIG. 5 is a sectional plan view showing a mechanism which conveys the shifting force in the transmission.
Figure 6:
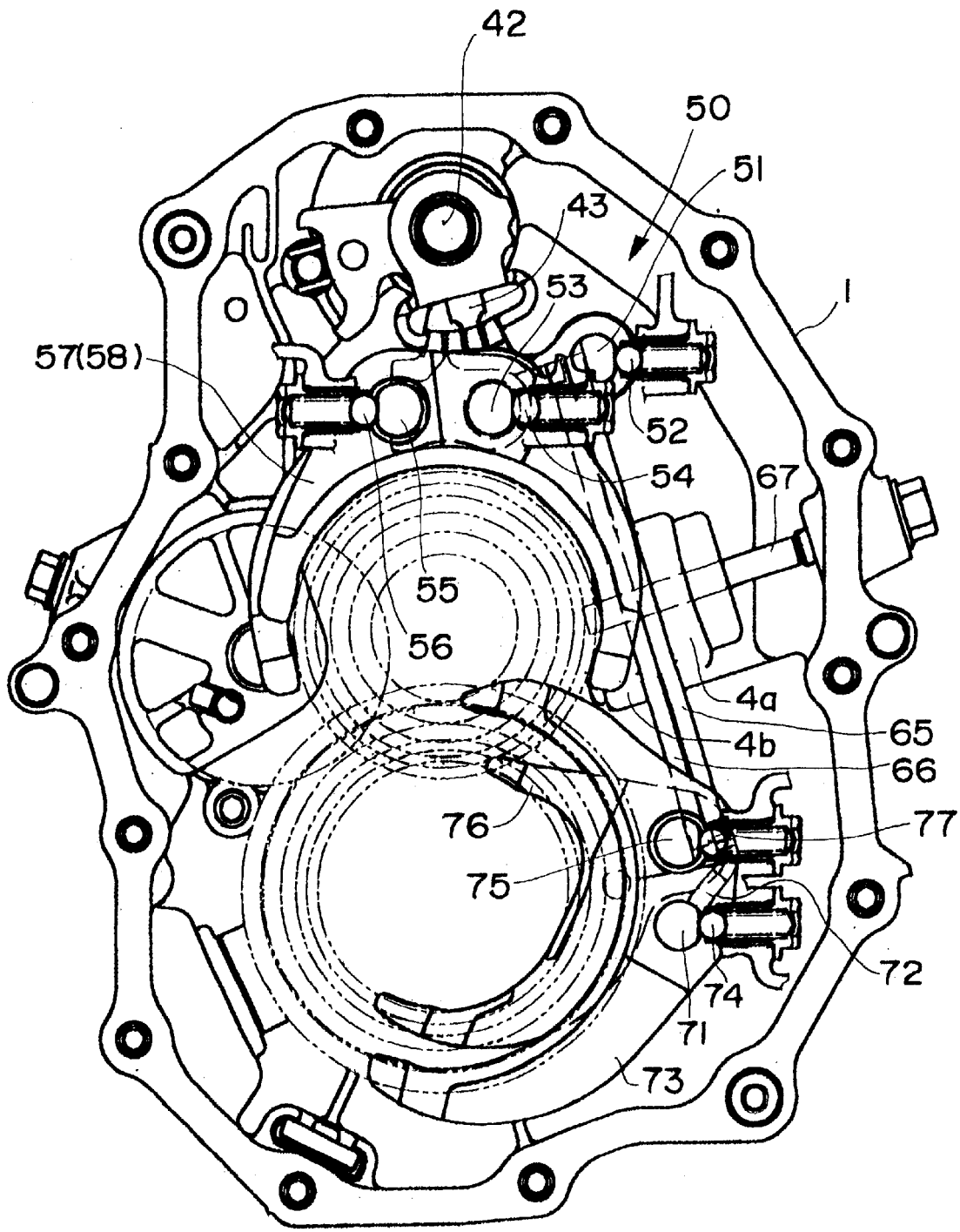
FIG. 6 is a sectional view of the transmission, taken toward the engine, showing the internal structure of the transmission including the above mentioned shifting force conveying mechanism.

FIG. 5 shows a mechanism 50 which includes these shift pieces and conveys the shifting force. Now, this shifting force conveying mechanism 50 is described with reference to FIG. 5 and FIG. 6. FIG. 6 is a view of the transmission without the second casing 2, being looked at toward the first casing 1, but it shows detent mechanisms 52, 54 and 56, which are provided in the second casing 2, to make the description more easily understandable.

The shifting force conveying mechanism 50 is located at the upper part of the first room 8, and it comprises a LOW or SECOND shift rod 51, a THIRD or FOURTH shift fork shaft 53 and a FIFTH or SIXTH shift fork shaft 55. The right ends of these shift rod and fork shafts are supported by the first partition wall 4 while the left ends are supported by the second partition wall 5, respectively, and they are movable in the axial direction. The LOW or SECOND shift rod 51 is provided with a whirl-stop 51c and detent furrows 51a, which are used in cooperation with a detent mechanism 52 for setting one of the following three positions: specifically, LOW, NEUTRAL and SECOND. In the same way, the THIRD or FOURTH shift fork shaft 53 and the FIFTH or SIXTH shift fork shaft 55 are provided with detent furrows 53a and 55a, respectively, which are used in cooperation with detent mechanisms 54 and 56, respectively, for setting one of the three positions: THIRD, NEUTRAL and FOURTH, and FIFTH, NEUTRAL and SIXTH, respectively.

In addition, the LOW or SECOND shift rod 51, the THIRD or FOURTH shift fork shaft 53 and the FIFTH or SIXTH shift fork shaft 55, respectively, are provided with a LOW or SECOND shift piece 61, a THIRD or FOURTH shift piece 62 and a FIFTH or SIXTH shift piece 63, which are fixed thereon. Furthermore, a REVERSE shift piece 64 is provided movably in the axial direction on the THIRD or FOURTH shift fork shaft 53. These shift pieces 61~64 include selector grooves 61a~64a, respectively, which are aligned laterally. The front end of the selector arm 43 is designed to engage one of the selector grooves 61a~64a. By moving the shift lever 41 in the X direction, the front end of the selector arm 43 is selectively engaged to one of the selector grooves 61a~64a, and by moving the shift lever 41 in the Y direction, the shift piece which has the selector groove engaged to the selector arm 43 is transferred in the axial direction.

The THIRD or FOURTH shift fork shaft 53 and the FIFTH or SIXTH shift fork shaft 55 are provided with a THIRD or FOURTH shift fork 57 and a FIFTH or SIXTH shift fork 58, respectively. The THIRD or FOURTH shift fork 57 is fixed on the THIRD or FOURTH shift fork shaft 53 and is axially slidable on the FIFTH or SIXTH shift fork shaft 55. On the other hand, the FIFTH or SIXTH shift fork 58 is fixed on the FIFTH or SIXTH shift fork shaft 55 and is axially slidable on the THIRD or FOURTH shift fork shaft 53. The THIRD or FOURTH shift fork 57 engages the THIRD or FOURTH synchro-sleeve 45, which activates the THIRD clutch 33 and the FOURTH clutch 34, while the FIFTH or SIXTH shift fork 58 engages the FIFTH or SIXTH synchro-sleeve 46, which activates the FIFTH clutch 35 and the SIXTH clutch 36. Therefore, by manipulating the shift lever 41, the selector arm 43 is engaged, for example, to the selector groove 62a or 63a of the THIRD or FOURTH shift piece 62 or the FIFTH or SIXTH shift piece 63, and then the THIRD or FOURTH shift fork shaft 53 or the FIFTH or SIXTH shift fork shaft 55 is transferred appropriately in the axial direction to selectively activate one of the THIRD–SIXTH clutches 33–36.

The LOW or SECOND synchro-sleeve 47, which activates the LOW and SECOND clutches 31 and 32, and the REVERSE synchro-sleeve 48, which activates the REVERSE clutch 37, are located on the countershaft 12 at the lower part of the transmission. Therefore, a LOW or SECOND shift fork 73 and a REVERSE shift fork 76, which engage these synchro-sleeves 47 and 48, are mounted, respectively, on a LOW or SECOND shift fork shaft 71 and a REVERSE shift fork shaft 75, which are provided movably in the axial direction at the lower part of the transmission. The LOW or SECOND shift fork 73 is fixed on the LOW or SECOND shift fork shaft 71 and is axially slidable on the REVERSE shift fork shaft 75 while the REVERSE shift fork 76 is fixed on the REVERSE shift fork shaft 75 and is axially slidable on the LOW or SECOND shift fork shaft 71.

When the LOW or SECOND shift fork shaft 71 or the REVERSE shift fork shaft 75 is transferred appropriately in the axial direction by manipulating the shift lever 41, the LOW or SECOND shift fork 73 or the REVERSE shift fork 76 moves correspondingly, and the LOW or SECOND synchro-sleeve 47 or the REVERSE synchro-sleeve 48 is transferred appropriately in the axial direction. As a result, one of the LOW, SECOND and REVERSE clutches 31, 32 and 37 can be selectively activated. In order to convey the force applied to the shift lever 41 to achieve the appropriate movement of the LOW or SECOND shift fork shaft 71 or the REVERSE shift fork shaft 75, a LOW or SECOND rocking lever 65 and a REVERSE rocking lever 66 are provided laterally in the first room 8 as detailed in FIGS. 6, 7 and 8.

Figure 9:
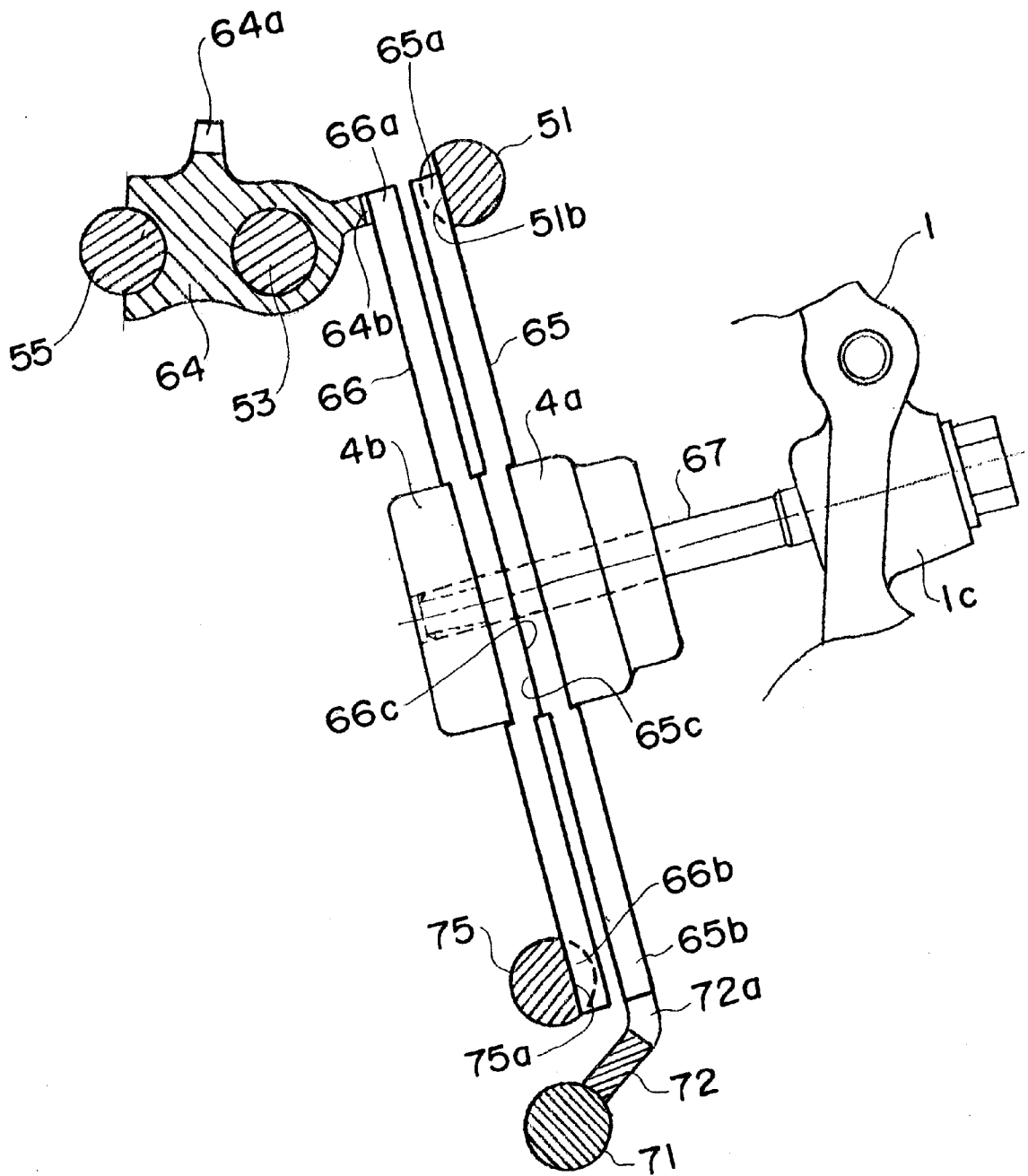
FIG. 9 is a sectional view showing the construction of these rocking levers, which constitute the shifting force conveying mechanism.

These two rocking levers 65 and 66 are long plate-like members and positioned close to each other and are supported by a pair of retaining ribs 4a and 4b, which protrude from the first partition wall 4 into the first room 8. More specifically, an aperture is provided extending from the outer surface of the first casing 1 and passing through the retaining ribs 4a and 4b, and a retaining pin 67 is inserted from the outside of the casing into this aperture to support the rocking levers 65 and 66 at the center thereof as shown in FIGS. 6 and 9. In this condition, each rocking lever is independently pivotable around the retaining pin 67. Because of this arrangement, the rocking levers 65 and 66 are easily mountable. They are placed between the retaining ribs 4a and 4b and then pinned with the retaining pin 67, which is inserted from the outside. Furthermore, it is preferable that the retaining ribs 4a and 4b be molded together with the first casing 1. By molding, the number of parts required for the mechanism is maintained relatively small, and also the parts are positioned accurately in assembly.

Figure 7:
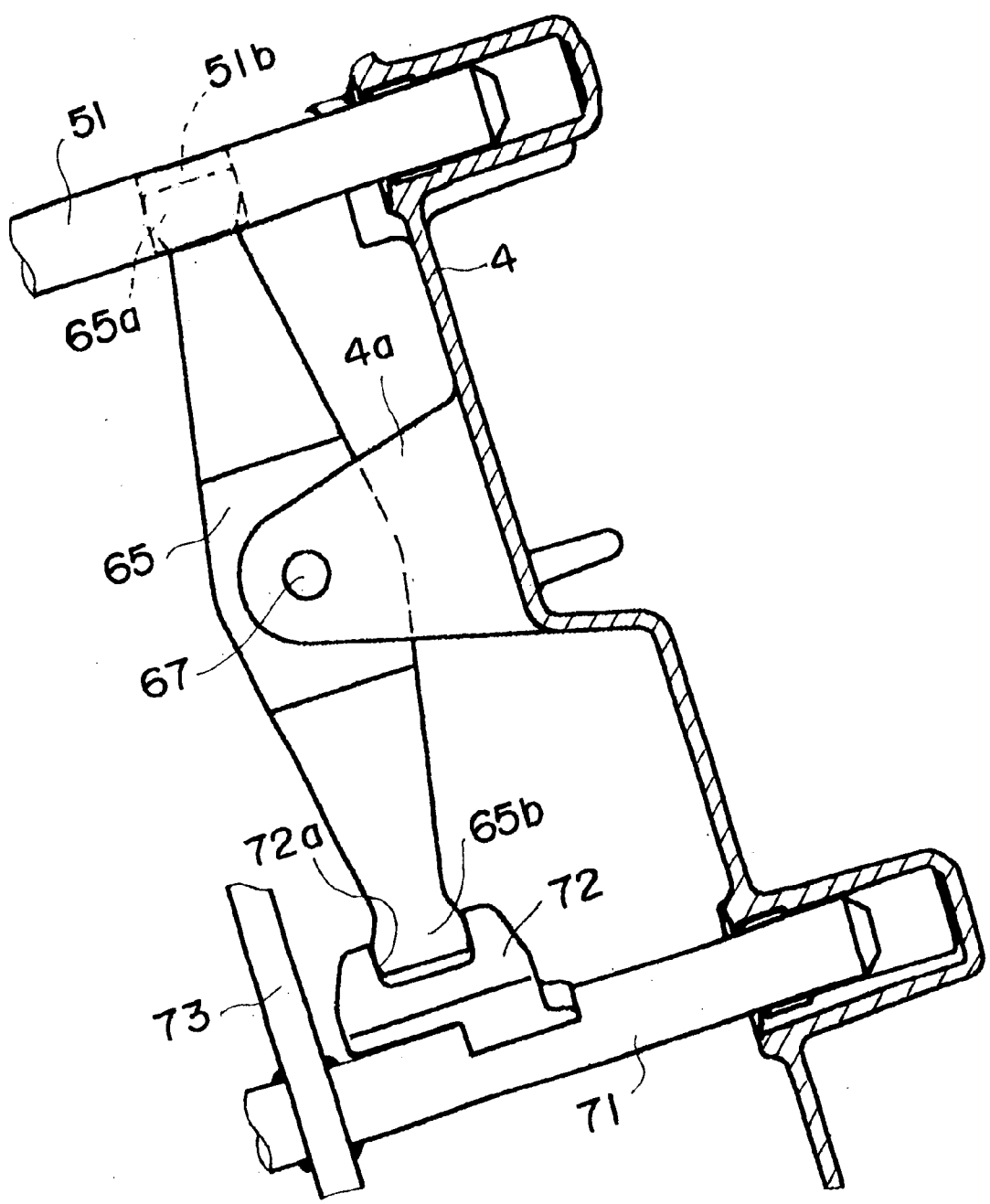
FIG. 7 is a sectional view showing the construction of a LOW or SECOND rocking lever, which constitutes a linkage conveying a shifting force.

As shown in FIGS. 7 and 9, the upper end 65a of the LOW or SECOND rocking lever 65 is set in a recess 51b which is provided on the LOW or SECOND shift rod 51 while the lower end 65b is set in an engaging groove 72a which is provided on an engaging member 72 fixed on the LOW or SECOND shift fork shaft 71. In this construction, when the LOW or SECOND shift rod 51 is transferred in the axial direction by manipulating the shift lever 41, the LOW or SECOND shift fork shaft 71 is transferred in the opposite axial direction by the movement of the LOW or SECOND rocking lever 65, which movement is caused by the movement of the LOW or SECOND shift rod 51. As a result, the LOW or SECOND synchro-sleeve 47 is shifted in the axial direction correspondingly by the LOW or SECOND shift fork 73, which is fixed on the LOW or SECOND shift fork shaft 71. Thus, the LOW or SECOND clutch 31 or 32 can be activated selectively.

Figure 8:
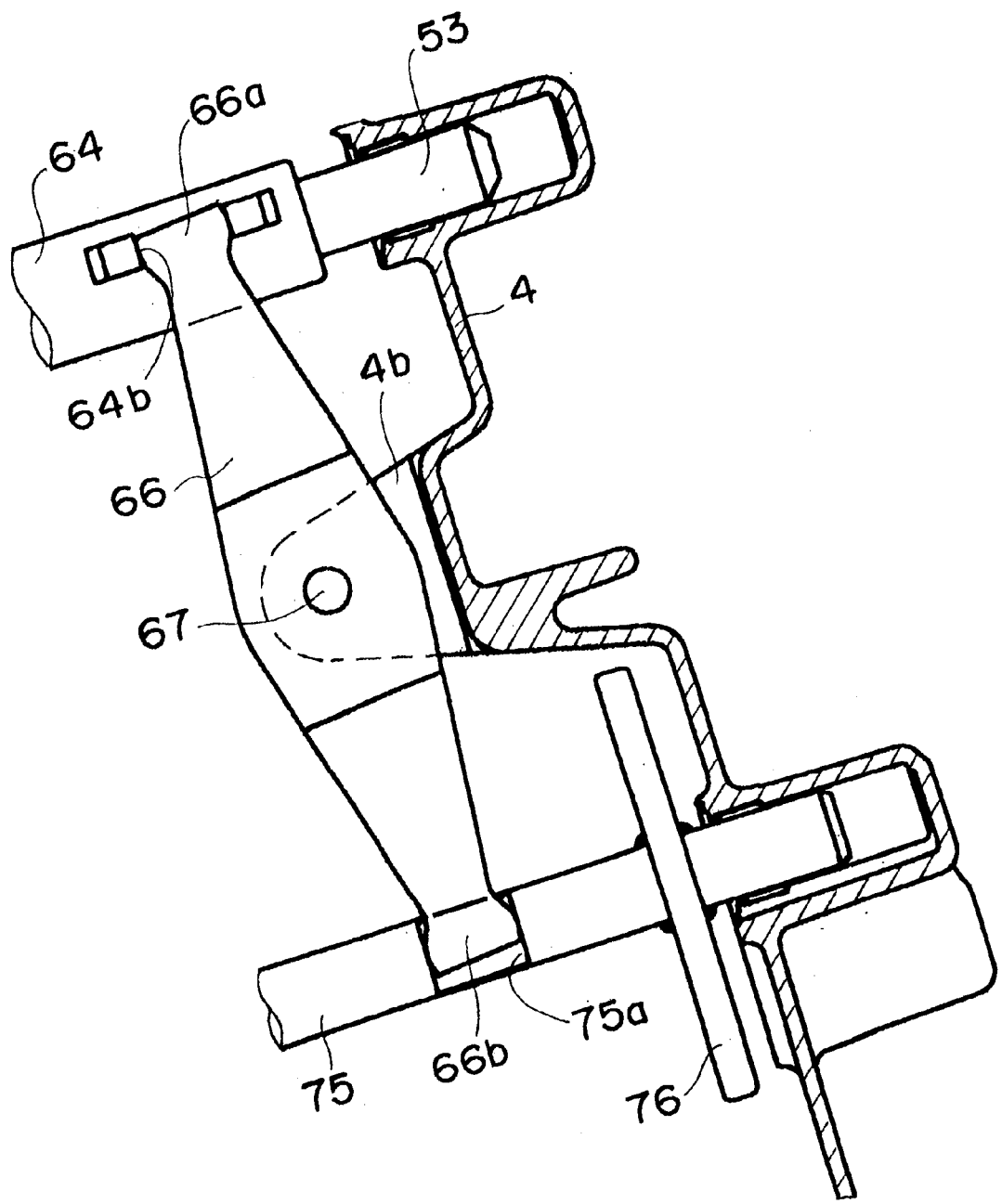
FIG. 8 is a sectional view showing the construction of a REVERSE rocking lever, which constitutes a linkage conveying a shifting force.

As shown in FIGS. 8 and 9, the upper end 66a of the REVERSE rocking lever 66 is set in an engaging groove 64b which is provided in the REVERSE shift piece 64 while the lower end 66b is set in a recess 75a which is provided on the REVERSE shift fork shaft 75. In this condition, when the REVERSE shift piece 64 is transferred in the axial direction on the THIRD or FOURTH shift fork shaft 53, the REVERSE shift fork shaft 75 is transferred in the opposite axial direction by the movement of the REVERSE rocking lever 66, which is caused by the transfer of the REVERSE shift piece 64. As a result, the REVERSE synchro-sleeve 48 is shifted in the axial direction correspondingly by the REVERSE shift fork 76, which is fixed on the REVERSE shift fork shaft 75, to activate the REVERSE clutch 37.

As shown in FIG. 9, the LOW or SECOND rocking lever 65 and the REVERSE rocking lever 66 include smooth contact surfaces 65c and 66c at the pivotal centers there of, respectively. With these contact surfaces, each of the two rocking levers can slide on each other smoothly and swing independently. When these rocking levers 65 and 66 are assembled into the mechanism, their correct orientation is easily, visually confirmable by matching the contact surfaces 65c and 66c. This way of assembly is foolproof and prevents the rocking levers from being positioned in any wrong way.

As FIG. 9 shows clearly, a lateral side of the LOW or SECOND rocking lever 65 at the upper end 65a meets the bottom of the recess 51b of the LOW or SECOND shift rod 51 while a lateral side of the REVERSE rocking lever 66 at the upper end 66a meets the bottom of the engaging groove 64b of the REVERSE shift piece 64. In this condition, the upper ends 65a and 66a of the rocking levers 65 and 66 are sandwiched between the LOW or SECOND shift rod 51 and the REVERSE shift piece 64, so the rocking levers 65 and 66 are maintained there together, securely without dislocation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A gearshift for a transmission which incorporates a plurality of speed change gear trains, a plurality of clutch means to select said gear trains for power transmission and a plurality of shift forks to activate said clutch means, said gearshift capable of selectively conveying a force applied by a shift lever to said shift forks to achieve a gear change; wherein:

said gearshift comprises a plurality of shifting force conveying linkages, each of which conveys the force applied by said shift lever to a corresponding one of said shift forks, at least two of said shifting force conveying linkages each comprising a rocking lever, which functions to reverse a direction of the force applied by said shift lever; and said rocking levers in plurality are disposed on a common pivot, such that each rocking lever can swing independently thereon;

some of said shifting force conveying linkages in plurality, which branch out, further comprise shift fork support members, which are supported axially movably by said transmission housing, at least one shift fork and shift piece being fixed on each of said shift fork support members;

remainders of said shifting force conveying linkages in plurality, which branch out, further comprise shift members and additional shift fork support members, said additional shift members and said shift fork support members being supported axially movably by said transmission housing, at least one shift fork being fixed on each of said additional shift fork support members, and at least one shift piece being fixed on each of said shift members; a first end of each rocking lever engages at least one of said shift members and a second end of each rocking lever engages at least one of said additional shift fork support members; and said selector arm selectively engages said shift pieces.

2. The gearshift as set forth in claim 1, wherein:

said rocking levers in plurality include smooth contact surfaces near said pivot where said rocking levers meet one another in sliding contact, such that said rocking levers disposed next to one another can swing independently and smoothly around said pivot.

3. The gearshift as set forth in claim 1, wherein: said rocking levers in plurality are disposed next to one another and are capable of swinging around said pivot;

each of said rocker levers engage, with a first end thereof, lever side members which are connected to and moveable by said shift lever and, with a second end thereof, engage fork side members which are connected to and movable with a corresponding one of said shift forks; and at least said one ends or said other ends of said rocking levers are retained between said lever side members or between said fork side members, at lateral outsides of said rocking levers in a direction of said pivot.

4. The gearshift as set forth in claim 1, wherein: said rocking levers in plurality being disposed next to one another are supported pivotally around said common pivot by a retaining rib which is formed with a transmission housing in a one piece body.

5. The gearshift as set forth in claim 4, wherein:

an aperture is provided extending from an outside of said transmission housing through said retaining rib; and a retaining pin is inserted from outside into said aperture to support said rocking levers pivotally.

6. The gearshift as set forth in claim 4, wherein:

said retaining rib comprises a pair of ribs; and said rocking levers in plurality are supported between said pair of ribs.

7. The gearshift as set forth in claim 1, wherein:

said shifting force conveying linkages in plurality comprise a main shift rod and a selector arm as common link members, said main shift rod being supported rotatably and axially movably by a transmission housing and being rotatable and axially movable by said shift lever, and said selector arm being fixed on said main shift rod.

8. The gearshift as set forth in claim 1, wherein:

said at least two rocking levers are sandwiched between and engaged respectively to two of said shift members of said remainders of said shifting force conveying linkages in plurality, which branch out.

* * * * *